March 3, 1942.                T. J. SMULSKI                2,275,237
                            INDICATING SYSTEM
                            Filed July 17, 1940

INVENTOR
Theodore J. Smulski
BY Alois W. Graf
ATTORNEY

Patented Mar. 3, 1942

2,275,237

UNITED STATES PATENT OFFICE 2,275,237

INDICATING SYSTEM

Theodore J. Smulski, Gary, Ind., assignor to The Anderson Company, a corporation of Indiana Application July 17, 1940, Serial No. 346,007

11 Claims. (Cl. 177—351)

My invention relates to indicating systems and more particularly to systems for indicating quantitatively a variable factor.

Frequently, it is desirable to provide accurate remote indication of a variable factor such as liquid level, liquid pressure, speed, temperature or the like, where the principal source of electric power is subject to voltage variations. While numerous circuits have been proposed for eliminating the error introduced, many of these have been economically unsuited to certain applications because of the complex circuit and structural arrangements involved therein.

It is, therefore, an object of my invention to provide a new and improved electrical system for accurately indicating quantitatively a variable factor which will overcome certain limitations of the arrangements of the prior art and which will be simple and reliable to operate.

Another object of my invention is to provide a new and improved electrical system for remotely indicating quantitatively a variable factor which will be accurate, simple and economical.

Still another object of my invention is to provide a new and improved electrical remote indicating system utilizing a source of power subject to voltage variations which will be accurate at all times.

The novel features which I believe to be characteristic of my invention are set forth with particularity in the appended claims. My invention itself, however, both as to its organization and method of operation, together with further objects and advantages thereof, will be better understood by reference to the following description taken in connection with the accompanying drawing, in which Fig. 1 shows one circuit arrangement embodying my invention;

Figure 1:
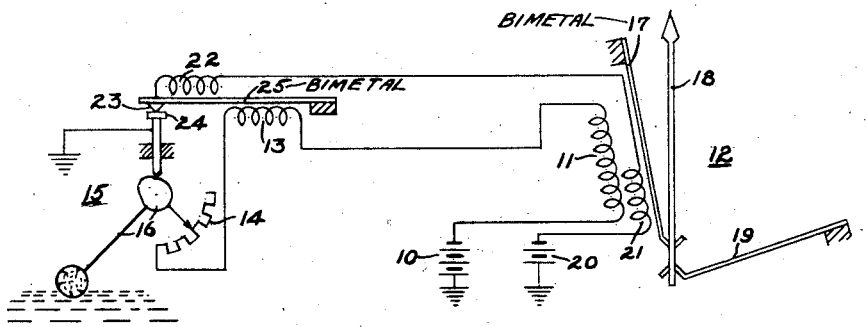

Referring to Fig. 1 of the drawing, I have shown therein the application of my invention to a circuit for remotely indicating quantitatively a variable factor such as liquid level. While for the purposes of illustration, liquid level indicating means have been shown, it is to be understood that the application of the circuit may be made to other variable factors such as liquid pressure, temperature, speed or the like. In the arrangement shown, the electrical circuit is energized from a source of electric power 10 which is subject to voltage variations. One terminal of the power source 10 is connected to the ground and the other terminal is connected through a coil 11 of a remotely disposed indicating instrument 12 through a heating coil or means 13 and the variable resistor 14 of a sending instrument 15 back to ground. The variable resistor 14 is actuated by means 16 which are responsive to the variable factor, such as liquid level, which is to be indicated quantitatively by the indicating instrument 12. This means 16 which is responsive to the variable factor may be any suitable means, but for simplicity in illustration this has been shown as comprising a float member which is connected to a cam, and to a contact arm of the variable resistor 14. Any adjustment of the variable resistor 14 by the variable factor responsive means 16 will vary a total power flowing through the circuit from the power source 10. This power flows through the heating coil 13, the purpose of which will subsequently become apparent, and also through the coil 11. The coil 11 is placed in close proximity to a thermally responsive element 17 which serves to actuate the indicating hand 18 of the indicating instrument 12. The indicating hand 18 is supported by the thermal element 17 and a supporting member 19. Thus, if the source of electrical power 10 were maintained at a constant voltage, the instrument 12 would indicate the variable factor, such as the level of a liquid. If, however, the voltage of the power source 10 falls below a predetermined value, this indication of the instrument 12 would be inaccurate and in order to correct such condition a second circuit may be provided. This second circuit has been shown as being supplied with power from a source 20, one side of which is connected to the ground and the other side of which is connected through the coil 21 of the indicating instrument 12, a second coil 22, a pair of contacts 23 and 24 of the sending instrument 15, back to ground. The coil 21 is placed in close proximity to the thermally responsive element 17 of the indicating instrument 12, so that the coil 21 may supply heat to this element. The coil 22 is placed in heat conductive relation to another thermally responsive element 25, which is mounted at one end thereof, and which carries the electrical contact 23 at the other end thereof. The other electrical contact 24 is arranged so that its position is determined by means responsive to the variable factor to be indicated. This is accomplished by having the contact 24 actuated by the cam member of the variable factor responsive means 16. Whenever the voltage of the electric power source 10 of the first described circuit falls below the predetermined amount, the heating effect of the power flowing through the coil 13 which is in heat conductive relation to the thermally responsive element 25 will be insufficient to maintain a separation of the electric contacts 23 and 24. When the contacts 23 and 24 are closed, electric power flows through the heating coil 22, thus causing the thermally responsive element 25 to again open these contacts. The current transmitted by the contacts 23 and 24 under these conditions where the voltage of the source 10 is less than a predetermined amount will comprise a series of current pulses which are transmitted from the source of power 20 through the heating coil 21, which in turn is in heat conductive relation to the thermally responsive element 17, which actuates the indicating hand 18 of the indicating instrument 12. Since the actuating member 17 is a thermally responsive element, the heat lag thereof is sufficient to maintain the indicating hand 18 in a steady indicating position.

While for the purpose of describing the operation of the system shown in Fig. 1, I have illustrated two sources of power 10 and 20 as supplying the power to the indicating system, it will, of course, be apparent that these two sources may be combined into a single source of power. This will be apparent since the contacts 23 and 24 intermittently supply just sufficient additional power to the indicating instrument 12 to compensate for the dropping voltage of the electrical power source below a predetermined value. Thus, the indication of a variable factor is always accurate, regardless of the fact that the source of power is subject to voltage variations.

Figure 2:
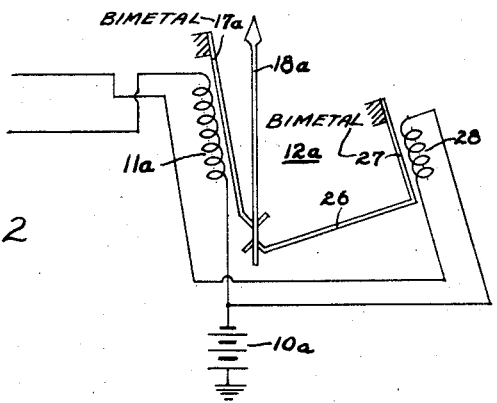
Fig. 2 shows a modification of Fig. 1.

In addition to combining two sources of power such as 10 and 20 of Fig. 1, I have shown in Fig. 2 a modification of the manner in which the receiving instrument may be made responsive to the additional power supplied to the circuit whenever the voltage of the source of power drops below a predetermined value. Thus in Fig. 2 I have shown a receiving instrument 12a provided with a heating coil 11a in close proximity to a thermally responsive element 17a which serves to actuate the indicating hand 18a. The indicating hand 18a is supported from a thermally responsive element 17a and a support member 26 which is provided with a thermally responsive portion 27 arranged to be heated by a coil 28. The heating coil 11a is connected in series with a source of power 10a and the heating coil 13 and the variable resistor 14 both shown in Fig. 1. Whenever the voltage of the source of power 10a is relatively constant at a predetermined value the indicating instrument 12a is actuated solely by the current flowing through the coil 11a. This current is determined by the means 16 of Fig. 1 which is responsive to the variable factor to be indicated. Whenever the voltage of the source 10a drops below a predetermined value, current is supplied from this source through the heating coil 28 which is connected in series with coil 22 and contacts 23 and 24 of Fig. 1. The additional energy supplied through the coil 28 heats the thermally responsive portion 27 of the support means 26 thereby changing the pivotal point of the indicating hand 18a an amount sufficient to compensate for the drop in voltage of the source 10a below a predetermined value.

Figure 3:
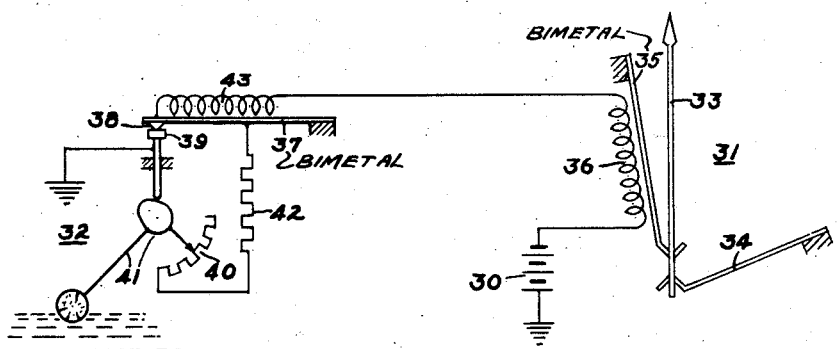
Fig. 3 shows another circuit arrangement embodying my invention.

In Fig. 3, I have shown another circuit arrangement utilizing a source of electrical power 30 which is subject to voltage variations and which is connected between the ground and a remotely disposed indicating instrument 31 and a transmitting instrument 32, which is responsive to a variable factor. The indicating instrument 31 is provided with an indicating hand 33 supported by a member 34 and a thermally responsive member 35. The thermally responsive member is arranged to be heated by electric power flowing through a heating coil or means 36 which is in series with a source of power 30, and the transmitting instrument 32. The transmitting instrument 32 is provided with a thermally responsive element 37 which is supported at one end thereof and which carries at its other end an electrical contact 38, which in turn cooperates with an electrical contact 39 which is connected to the ground. The transmitting instrument 32 is provided with a variable resistor 40, the contact of which may be adjusted in accordance with the variable factor by a means 41 which is responsive to this variable factor. This, for purposes of illustration, has been shown as being applied to liquid level indication and comprises a flow which actuates the adjustable contact of the variable resistor 40. The variable resistor 40 is connected through a fixed resistor 42 and a heating coil 43, and the heating coil 36 of the indicating instrument 31. The heating coil 43 of the transmitting instrument 32 is arranged in heat conductive relation to the thermally responsive element 37, so that whenever the voltage of the electric power source 30 falls below a predetermined value the electric contacts 38 and 39 will be actuated.

In operation, electric current flows from a source of power 30 through the heating coil 36 of the indicating instrument 31, through the heating coil 43 of the transmitting instrument 32, a resistor 42 and the adjustable resistor 40 to the ground which is connected to the contact 39. A contact 39 is adjusted in position in accordance with means responsive to the variable factor to be indicated and for purposes of illustration this has been shown as being indicated by a cam mechanism actuated by a float on the level of the liquid. If the voltage of a source 30 is equal to a predetermined value, the heating effect of the coil 43 on a thermally responsive element 37 is sufficient to maintain separation of the electric contacts 38 and 39. If the source of voltage 30, however, drops below a predetermined value, the heat supply by the coil to the thermally responsive element is insufficient to maintain operation of the electric contacts 38 and 39, which are connected in parallel to the adjustable resistor 40 and the fixed resistor 42. The contacts 38 and 39 will be closed for an interval just sufficient to compensate for the drop in the voltage of the source 30. Thus, these contacts 38 and 39 are intermittently actuated so as to transmit a series of current pulses, or in other words to periodically increase the current transmitted through the circuit thereby to supply sufficient heat by means of the coil 36 to the thermally responsive element 35 of the indicating instrument 31 to produce accurate indications of the variable factor to be indicated irrespective of voltage variations.

The arrangement shown in Fig. 3 may readily be applied by anyone skilled in the art for indicating liquid pressure, temperature or speed, by simple mechanical arrangements for actuating the variable factor responsive means 15 of Fig. 1, or 41 of Fig 3. For example, if liquid pressure is to be indicated, a flexible diaphragm could be utilized which would be actuated by the pressure and which in turn would permit actuation of the cam and the adjustable arm of the variable resistor. For the indication of speed, the movement of a fly-ball governor could be used to actuate the electric contacts and the variable resistor, and, similarly, the expansion of a thermally responsive element such as a rod or a bi-metallic bar could be used to actuate the necessary circuit elements for producing a proper effect in the circuit shown in Figs. 1 and 3. While, furthermore, the remotely disposed indicating instrument in each instance has been shown as comprising a device having an indicating hand actuated by a thermally responsive element such as a bi-metallic bar, it will, of course, be apparent that any other type of indicating instrument may be utilized where this instrument would be responsive to the total power flowing through the transmitting end of the system.

While I have shown and described my invention in connection with certain specific embodiments, it will, of course, be understood that I do not wish to be limited thereto, since it is apparent that the principles disclosed herein are susceptible of numerous other applications, and modifications may be made in the circuit arrangement and in the instrumentalities employed without departing from the spirit and scope of my invention, as set forth in the appended claims.

What I claim as new and desire to secure by Letters Patent of the United States is:

1. A system for quantitatively indicating a variable factor comprising an electric circuit energized from a source of electric power subject to voltage variations, an indicating instrument connected in said circuit, means responsive to said variable factor for controlling the flow of current to said instrument, and means responsive to said variable factor and to a decrease in voltage of said source below a predetermined value for transmitting additional power to said instrument to compensate for said decrease in voltage.

2. A system for remotely indicating the amount of a variable factor comprising a variable resistor, means responsive to said variable factor for actuating said resistor, an electric circuit for said resistor including a source of electric power subject to voltage variations, a thermally responsive element heated by the current flowing in said circuit, a pair of electric contacts controlled by said element and in accordance with said variable factor, said contacts being arranged to control the supply of additional heating power to said element whenever the voltage of said power source is below a predetermined value, and a remotely disposed indicating instrument connected in said circuit so as to be responsive to the total flow of power supplied to heat said element.

3. A system for quantitively indicating a variable factor comprising an electric circuit energized from a source of electric power subject to voltage variations, an indicating instrument connected in said circuit, means responsive to said variable factor for controlling the flow of current to said instrument, and means responsive to said variable factor and to a decrease in voltage of said source below a predetermined amount, said latter means comprising a thermally responsive element arranged to be heated by current transmitted to said instrument, a pair of electric contacts one of which is controlled by said element, the other of which is controlled by said variable factor responsive means, and circuit means connecting said contacts to control the transmission of additional power to said instrument to compensate for the voltage variation of said source.

4. A system for quantitatively indicating a variable factor comprising a source of electric power subject to voltage variations, an electric circuit including said source, an indicating instrument and means for controlling the flow of current in said circuit, said latter means being controlled in accordance with said variable factor, a second electric circuit including said instrument and a pair of electric contacts, means responsive to said variable factor for controlling the position of one of said contacts, a thermally responsive element arranged to be heated by current flowing through both said circuits, said element controlling the other of said contacts whereby whenever said source of electric power decreases in voltage from a predetermined amount said second circuit will supply additional power to said instrument to compensate for said voltage variations.

5. A system for remotely indicating the amount of a variable factor comprising a variable resistor; means responsive to said variable factor for actuating said resistor, an electric circuit for said resistor including a source of electric power subject to voltage variations and an indicating instrument, and means responsive to a decrease in the voltage of said source below a predetermined amount for supplying additional power to said indicating instrument sufficient to maintain accurate indication, said means comprising a thermally responsive element heated by the current flowing through said resistor, a pair of electric contacts controlled by said element and said variable factor, said contacts being arranged to control the supply of additional heating current to said element whenever the voltage of said power source is below a predetermined value, and means for causing said indicating instrument to be responsive to said additional power supplied to heat said thermally responsive element.

6. A system for quantitatively indicating a variable factor comprising a source of electric power subject to voltage variations, a thermally responsive element, a pair of electric contacts one of which is controlled by said element, means for heating said element, means connecting said contacts and said heating means in series with said source of power, means responsive to said variable factor for controlling the position of one of said contacts, means connected in circuit with said power source for continuously supplying heat to said element in accordance with the quantity of said variable factor, and a remotely disposed indicating instrument connected in said circuit for indicating the total power supplied by said power source.

7. A system for quantitatively indicating a variable factor comprising a source of electric power subject to voltage variations, an electric circuit including said source, an indicating instrument and means for controlling the flow of current in said circuit, said latter means being controlled in accordance with said variable factor, said instrument including a plurality of thermally responsive elements for producing an indication and means for heating said elements, one of said latter means being connected in said circuit, a second electric circuit including the other of said means for heating one of said thermally responsive elements and a pair of electric contacts, means responsive to said variable factor for controlling the position of one of said contacts, a thermally responsive element arranged to be heated by current flowing through both said circuits, said element controlling the other of said contacts whereby whenever said source of electric power decreases in voltage from a predetermined amount said second circuit will supply power to said means for heating said second mentioned thermally responsive element of said instrument thereby to compensate for said voltage variation.

8. A system for quantitatively indicating a variable factor comprising a source of electric power subject to voltage variations, an electric circuit including said source, an indicating instrument and means for controlling the flow of current in said circuit, said latter means being controlled in accordance with said variable factor, said instrument including a thermally responsive element for producing an indication and means for heating said element with current flowing in said circuit, a second electric circuit including said means for heating said thermally responsive element and a pair of electric contacts, means responsive to said variable factor for controlling the position of one of said contacts, a second thermally responsive element arranged to be heated by current flowing through both said circuits, said element controlling the other of said contacts whereby whenever said source of electric power decreases in voltage from a predetermined amount said second circuit will supply additional power to said means for heating said first thermally responsive element to compensate for the effect of said voltage variations on said indicating instrument.

9. A system for quantitatively indicating a variable factor comprising a source of electric power subject to voltage variations, a variable resistor connected in series with said source, means responsive to said variable factor for adjusting said resistor, a pair of electric contacts, means responsive to said variable factor for adjusting the position of one of said contacts, a thermally responsive element for controlling the position of the other of said contacts, a second source of electric power connected in series with said contacts, means for heating said element with power flowing through both said circuits, and a remotely disposed indicating instrument responsive to the total power flowing in both of said circuits.

10. A system for quantitatively indicating a variable factor comprising a source of electrical power subject to voltage variations, a remotely disposed instrument to indicate quantitatively said variable factor, means responsive to said variable factor connected in circuit with said source and said instrument for continuously supplying electric power from said source to said instrument in accordance with the quantity of said variable factor, a pair of electric contacts, means responsive to said variable factor for controlling the position of one of said contacts, a thermally responsive element for controlling the position of the other of said contacts, means for heating said element with the electric power supplied to said indicating instrument, said heating means being connected in series with said instrument, means connecting said contacts in parallel to said means responsive to said variable factor for continuously supplying power to said instrument and in series with said heating means whereby power will be transmitted by said contacts whenever the voltage of said source is less than a predetermined value.

11. A system for quantitatively indicating a variable factor comprising a source of power subject to voltage variations, a variable resistor, a pair of electric contacts, means responsive to said variable factor for adjusting said resistor and the position of one of said contacts, thermally responsive means for controlling the position of the other of said contacts, means for heating said thermally responsive means, means connecting said contacts and said heating means in series with said power source, means connecting said resistor and said heating means in series with said power source, and a remotely disposed indicating instrument connected in said circuit so as to be responsive to the total flow of power in said circuit.

THEODORE J. SMULSKI.